United States Patent
Rosasco et al.

(10) Patent No.: US 9,542,724 B1
(45) Date of Patent: Jan. 10, 2017

(54) SYSTEMS AND METHODS FOR STROKE RENDERING ON DIGITAL MAPS

(71) Applicant: GOOGLE INC., Mountain View, CA (US)

(72) Inventors: John Rosasco, Mountain View, CA (US); Travis McPhail, Mountain View, CA (US); Paul Vincent Byrne, Los Altos, CA (US); Daniel Jared Epstein, Mountain View, CA (US); Jim Brooks, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 192 days.

(21) Appl. No.: 14/153,951

(22) Filed: Jan. 13, 2014

Related U.S. Application Data

(60) Provisional application No. 61/844,388, filed on Jul. 9, 2013.

(51) Int. Cl.
*G06T 17/05* (2011.01)
*G06T 3/40* (2006.01)
*G06T 15/80* (2011.01)
*G06T 11/00* (2006.01)

(52) U.S. Cl.
CPC .............. *G06T 3/4007* (2013.01); *G06T 15/80* (2013.01); *G06T 17/05* (2013.01); *G06T 11/00* (2013.01)

(58) Field of Classification Search
None
See application file for complete search history.

(56) References Cited

U.S. PATENT DOCUMENTS

| | | | |
|---|---|---|---|
| 6,766,248 B2 | 7/2004 | Miyahara | |
| 7,928,990 B2 | 4/2011 | Jiao et al. | |
| 8,274,524 B1 * | 9/2012 | Cornell | G08G 1/0969 345/428 |
| 8,441,497 B1 | 5/2013 | Hutchins et al. | |
| 8,537,169 B1 | 9/2013 | Bolz et al. | |
| 8,803,901 B1 * | 8/2014 | Cornell | G08G 1/0969 345/428 |
| 8,937,627 B1 * | 1/2015 | Otero | G06F 3/1423 345/619 |

(Continued)

OTHER PUBLICATIONS

"Graphics.Rendering.OpenGL.GL.VertexSpec," HOpenGL Libraries. Retrieved from the Internet on Mar. 6, 2014: URL:http://cvs.haskell.org/Hugs/pages/libraries/OpenGL/Graphics-Renderig-OpenGL-GL-VertexSpec.html#2.

(Continued)

*Primary Examiner* — Ryan D McCulley
(74) *Attorney, Agent, or Firm* — Marshall, Gerstein & Borun LLP

(57) ABSTRACT

To provide smoothly scaleable map features on interactive digital maps, a first and a second sets of style parameters for rendering a map feature at a first zoom level and a second zoom level, respectively, are received. The first and second sets of style parameters are provided to a vertex shader. The vertex shader is configured to interpolate the first set of style parameters and the second set of style parameters to generate an interpolated set of style parameters for a certain zoom level between the first zoom level and the second zoom level, and render the map feature at the certain zoom level in accordance with the interpolated set of style parameters.

20 Claims, 10 Drawing Sheets

(56) References Cited

U.S. PATENT DOCUMENTS

| | | | |
|---|---|---|---|
| 2005/0206657 A1* | 9/2005 | Arcas | G01C 21/36 |
| | | | 345/660 |
| 2005/0219268 A1* | 10/2005 | Kyle | G08G 1/0969 |
| | | | 345/660 |
| 2006/0161572 A1* | 7/2006 | Vogt | G06T 13/20 |
| 2006/0267982 A1* | 11/2006 | Aguera y Arcas | G06F 3/0481 |
| | | | 345/428 |
| 2007/0171234 A1 | 7/2007 | Crawfis et al. | |
| 2008/0291201 A1 | 11/2008 | Lafon | |
| 2008/0303841 A1* | 12/2008 | Newhall, Jr. | G06T 1/60 |
| | | | 345/587 |
| 2010/0321399 A1* | 12/2010 | Ellren | G06F 17/30241 |
| | | | 345/587 |
| 2011/0242119 A1 | 10/2011 | Bolz et al. | |
| 2013/0018571 A1* | 1/2013 | Miwa | G01C 21/3694 |
| | | | 701/118 |
| 2013/0080504 A1 | 3/2013 | Maurer et al. | |
| 2013/0093757 A1 | 4/2013 | Cornell | |
| 2013/0147846 A1 | 6/2013 | Kalai et al. | |
| 2014/0043342 A1 | 2/2014 | Goel et al. | |
| 2014/0047381 A1* | 2/2014 | Fan | G06T 15/10 |
| | | | 715/800 |
| 2014/0347383 A1* | 11/2014 | Cornell | G08G 1/0969 |
| | | | 345/589 |

OTHER PUBLICATIONS

U.S. Appl. No. 14/153,951, filed Jan. 13, 2014.
International Search Report and Written Opinion for Application No. PCT/US2015/030816, dated Jul. 29, 2015.

* cited by examiner

SYSTEMS AND METHODS FOR STROKE RENDERING ON DIGITAL MAPS

CROSS-REFERENCE TO RELATED APPLICATION

This application claims priority to U.S. Provisional Patent Application No. 61/844,388, filed on Jul. 9, 2013, and titled "System and Methods for Stroke Rendering when Generating a Digital Map," the entire disclosure of which is hereby expressly incorporated by reference herein.

FIELD OF THE DISCLOSURE

The present disclosure relates to interactive digital maps and, more particularly, to rendering representations of paths on digital maps at various zoom levels.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Stylized Representation of Roads and Similar Features on Digital Maps

For information clarity, roads, bicycle paths, transit lines, and similar features are represented on digital maps in a stylized, rather than a realistic, form. For example, the style in which a road segment is represented on a digital map can include a set of visual parameters such as the number of strokes (e.g., one for the outline and one for the fill color), per-stroke attributes such as stroke width, stroke color, etc. The width of the stroke generally does not scale in proportion to the real-life width of the road, because doing so would make most roads invisible or barely visible at certain zoom levels.

In order to conserve bandwidth, a network server typically provides definitions of styles for rendering roads and other map features at several discrete zoom levels. In some cases, the network server does not provide style definitions for every discrete zoom level in the valid range. Thus, for example, the network server may provide style definitions for roads only at discrete zoom levels N and N+2, even if a client device at some point may display a digital map at zoom level N+1. Moreover, on some devices, such as smartphones and tablet computers capable of receiving gesture input, zoom levels form a continuum rather than a discrete scale. It is therefore possible for a client device to display a digital map at zoom level 7.5 or 8.45, for example. However, it is impractical for the server to attempt to provide style data to client devices for hundreds or thousands of fractional zoom levels.

When style information is unavailable for a certain zoom level, it is difficult for the client device to estimate the visual parameters both accurately and efficiently, and when estimates of visual parameters are not accurate or generated slowly, there are noticeable abrupt transitions (or "popping") between representations of roads as the user scales across certain zoom levels. In addition to sudden transitions in width (e.g., from three pixels to six), the user may notice abrupt displacement of graphics elements forming patterns on representations of roads, such as repeating arrows indicating the direction of travel along one-way streets. For example, the user may notice that arrows "jump" around to make room for additional arrows or to close gaps left by arrows that were removed.

Modern Hardware Graphics Renderers

To render stylized roads and other features as discussed above, a typical client device utilizes a hardware graphics renderer in a Graphics Processing Unit (GPU), that implements two pipeline shading stages: vertex shaders that operate on vertices visible in a frame and fragment shaders that operate on "fragments," or sets of pixels that make up a frame. For example, the client device can create a collection of triangles (made up of points defined in two or three dimensions) and pass the collection of triangles to the GPU. For each triangle T in the collection, the GPU then can run a vertex shader on each vertex of triangle T, and a fragment shader on each pixel enclosed by triangle T.

Modern hardware 3D graphics renderers, such as an OpenGL ES renderer, perform optimally when rendering state changes are minimal with respect to the amount of data being drawn. The basic I/O model of these hardware renderers can be described as follows: the renderers receive vertices and texture (pixel) data and produce fragments. Generally speaking, to render a frame of information on a hardware graphics renderer, the following steps are taken: (1) the region in memory for storing bitmaps, known as a "framebuffer," is cleared and (2) for each logical object in the rendered frame: (2a) vertex and texture data are prepared for rendering, (2b) the state of the graphics pipeline is set, and (2c) a draw function to draw the data is executed.

Step (2c) above describes a common programming loop. Accordingly, the fewer iterations there are of step (2c), the better the software application will perform. This principle of maximizing rendering performance can be referred to as "batching." To comply with the principle, software applications must batch together as many like elements of graphics state and draw these like elements atomically.

Another important principle for maximizing performance is to minimize shading logic. Vertex shaders are executed once per vertex for objects visible in a frame being rendered, whereas fragment shaders are executed once per output pixel (fragment) of the frame. A typical modern display may contain millions of pixels in an output frame and tens of thousands of vertices. To perform better, software applications must reduce the complexity of these shaders that must be run so frequently.

SUMMARY

Using the techniques of this application, a software module can receive style parameters, such as width, color, etc., for rendering stroke features at certain zoom levels from a network server. When rendering a digital map at a zoom level for which style parameters are unavailable, the software module efficiently and accurately interpolates the available style parameters for the desired zoom level. To this end, the software module in different embodiments encodes style information into style vertex attributes that augment a set of vertex attributes that contain spatial information or encodes style information into a texture and uses texture coordinate space transformation to resize a road, for example.

Further, using another technique of this application, a software module can generate a pattern of a recurring graphics element along a path (e.g., a sequence of arrows indicating the direction of travel on a one-way road) that smoothly scales up or down, so that transitions from N instances of the graphics element to approximately N/2 instances or 2N instances of the graphics element within a viewport do not appear sudden. To this end, the software module arranges multiple instances of the graphics element along the path at a high zoom level and displays some, but not all, of the instances of the graphics element at lower zoom levels at their original positions along the path.

More particularly, one embodiment of these techniques is a method for providing smoothly scaleable map features on interactive digital maps. The method includes receiving a first and a second sets of style parameters for rendering a map feature at a first zoom level and a second zoom level, respectively. The method further includes providing the first and second sets of style parameters to a vertex shader and configuring the vertex shader to (i) interpolate the first set of style parameters and the second set of style parameters to generate an interpolated set of style parameters for a certain zoom level between the first zoom level and the second zoom level, and (ii) render the map feature at the certain zoom level in accordance with the interpolated set of style parameters.

Another embodiment of these techniques is a computing device including one or more processors, a graphics processor, and a non-transitory computer-readable memory. The memory stores first instructions that implement a mapping module which, when executed on the one or more processors, provides first and a second sets of style parameters for rendering a map feature on a digital map at a first zoom level and a second zoom level, respectively, to the graphics processors. The method also stores second instructions that implement a vertex shader which, when executed on the graphics processors, interpolates the first set of style parameters and the second set of style parameters to generate an interpolated set of style parameters for a certain zoom level between the first zoom level and the second zoom level, and renders the map feature at the certain zoom level in accordance with the interpolated set of style parameters.

Still another embodiment of the techniques of this application is a method in a computing device for displaying patterns of recurring graphics on interactive digital maps. The method includes arranging multiple instances of a graphics element sequentially at respective positions along a path, and displaying a first digital map including a first representation of the path, at a first zoom level, including displaying each of the plurality of instances of the graphics element. The method further includes displaying a second digital map including a second representation of the path, at a second zoom level corresponding to lower magnification than the first zoom level, including (i) displaying a first subset of the plurality of instances of the graphic element at their original positions along the path, and (ii) not displaying a second subset of the plurality of instances of the graphic element, wherein the second subset includes instances disposed between instances in the first subset along the path.

Yet another embodiment of these techniques is a method in a computing device for displaying patterns of recurring graphics on interactive digital maps. The method includes displaying a first digital map including a representation of a path, at a first level of magnification; displaying, on the first digital map, multiple instances of a graphics element arranged sequentially on the path, including a first instance of the graphics element and a second instance of the graphics element that immediately follows the first instance on the path, at points on the first digital map representing a first geographic location and a second geographic location, respectively; displaying, at a second level of magnification higher than the first level, a second digital map including a representation of at least a portion of the path; and displaying the first instance and the second instance of the graphics element at points on the second digital map representing the first geographic location and the second geographic location, respectively, and a new instance of the graphics element disposed between the first instance and the second instance of the graphics element on the path.

DETAILED DESCRIPTION

Overview

Figure 1:
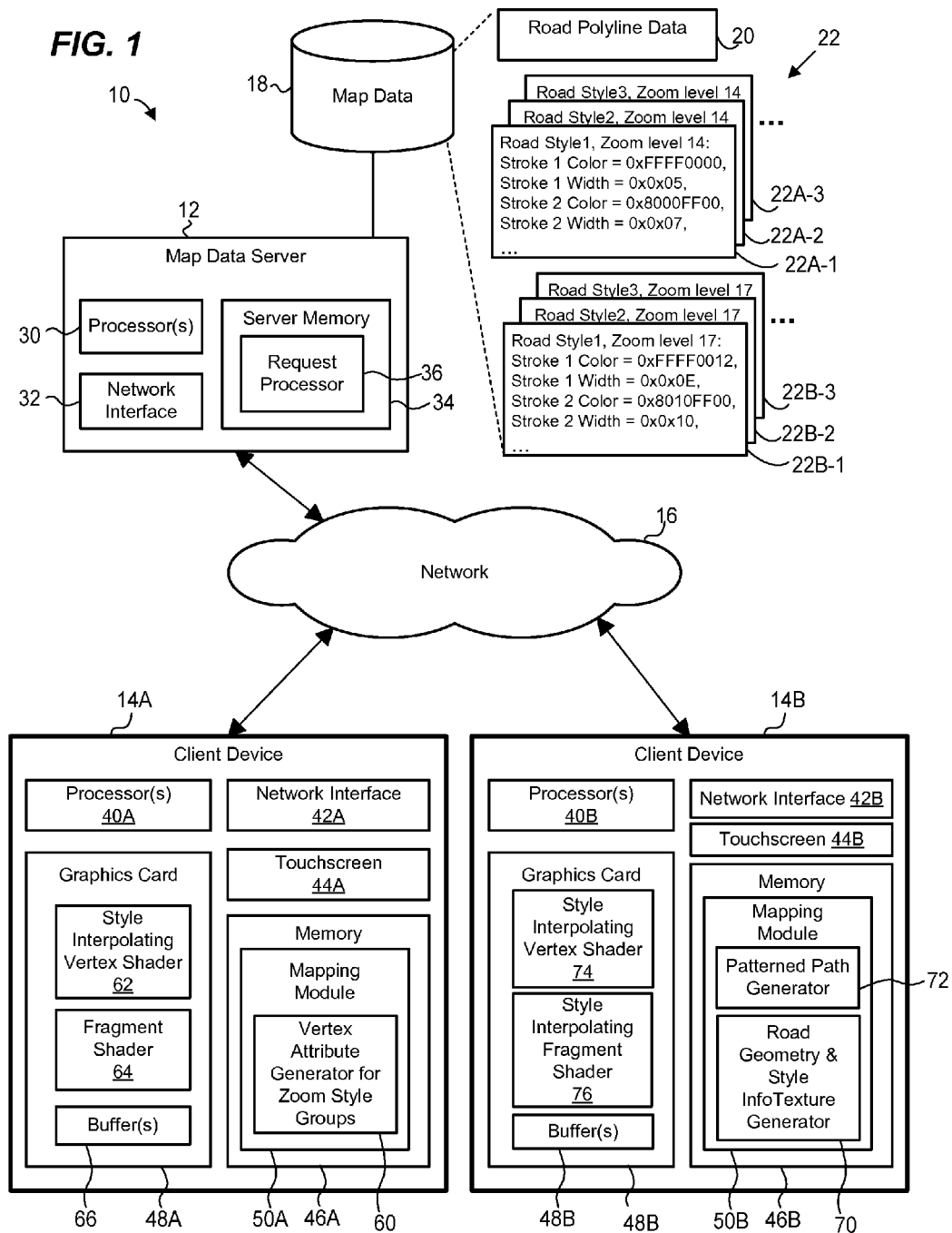
FIG. 1 is a block diagram of an example computing system in which interpolation and/or scaling techniques of this disclosure can be implemented.

Generally speaking, style interpolation discussed in this application allow a client device to smoothly scale roads, bicycle trails, and other map features drawn on a digital map using stroke-based rendering, across zoom levels for which style information is unavailable at the client device. The client device can be, for example, a smartphone or a tablet computer that receives map data and style information from a network server. Depending on the hardware, the operating system, the scope of application programming interface (API) functions, etc., different techniques discussed below can be better suited for different client devices.

According to one style interpolation technique, a mapping software module operates in a computing device implements a graphics pipeline that includes vertex shaders and fragment shaders. The mapping application receives style parameters, such as widths and colors of strokes and the number of strokes, for rendering roads and/or similar map features at certain zoom levels. To render the these map features at zoom levels for which style parameters are unavailable at the computing device, the mapping software module encodes style parameters as style vertex attributes to augment a set of conventional vertex attributes which contain spatial position information and texture coordinates. The mapping software module then provides style vertex attributes for zoom level N and zoom level M to a vertex shader, which interpolates the style parameters encoded in the style vertex attributes to generate style parameters for an intermediate zoom level (i.e., a zoom level between zoom level N and zoom level M, which may be discrete or fractional).

According to another technique, a mapping software module encodes style parameters for zoom levels N and M in a "texture," which can be a two-dimensional array that normally stores pixels as elements to define a bitmap. When a geographic area includes representations of roads of different types, the mapping software module encodes respective style parameters for all road types in the area. The mapping software module generates maximally extruded road geometry (to properly render the widest stroke among the possible stroke widths for all styles applied to the road) and assigns a corresponding style index to each road centerline. In operation, the vertex shader looks up style parameters and interpolates the parameters for the given zoom level, which can be between zoom levels N and M. In particular, the vertex shader interpolates the width and uses the interpolated width to transform texture coordinate space. The fragment shader in turn uses the transformed texture coordinates to sample a texture that defines portions of the road.

In this manner, the mapping software module calculates road geometry once for multiple zoom levels and effectively "stretches" the texture to resize the road. In other words, the mapping software module according to this technique transforms texture coordinate space rather than feature geometry.

Another technique of this disclosure allows a client device to smoothly scale patterns of repeating graphics elements arranged on a digital map along a certain path, such as instances of an arrows repeated along a representation of a road. Similar to the approaches outlined above, this technique does not require that the client device obtain and store definitions of the pattern for every possible zoom level at which the digital map can be displayed. Rather, a software module on the client device arranges multiple instances of the graphics element along the path at a high zoom level and displays some, but not all, of the instances of the graphics element at lower zoom levels at their original positions along the path. Transitions from N instances of the graphics element to approximately N/2 instances or 2N instances of the graphics element within a viewport do not appear sudden. Thus, in an example scenario, a road overlaid with sequentially arranged arrows is displayed on a touchscreen device. As the user gradually zooms in on a road segment on which two instances of the arrow are visible, the arrows continue to overlay their original geographic locations and accordingly travel apart as the zoom level increases. A new arrow fades in when the two original arrows are sufficiently far apart.

For further clarity, an example computing system in which some or all of the techniques outlined above can be implemented is discussed with reference to FIG. 1.

Overview of an Example Computing System

FIG. 1 is a block diagram of an example computing system 10 in which a map data server 12 provides map data to client devices 14A and 14B via a communication network 16 for rendering an interactive digital map. Map data, which can be stored in a map database 18, can include road polyline data 20. Besides roads designed for vehicles, the road polyline data 20 can describe bicycle paths, pedestrian paths, railway paths, shipping routes, airlines routes, etc. For convenience, all types of paths may be referred to in this application as "roads." Further, it is noted that the techniques of this disclosure also can apply to virtual boundaries of countries, cities, etc., when these boundaries are illustrated on a digital map using stroke-based rendering.

Map data stored in the map database 18 also can include descriptions of geometry for various other map features such as buildings, parks, and bodies of water, text labels, textures, various forms of metadata, etc. Some of these map features can be defined in a vector graphics format or another suitable scaleable format. In some cases, map data also can include raster images in a bitmap format, for example.

The map data server 12 can organize and serve map data to client devices using any suitable scheme, such as map tiling, for example. Map tiles generally correspond to a two-dimensional organization of geospatial data into a quadtree. Each tile at a given zoom level is divided into four tiles at the next level up to the highest level of magnification. Similarly, three-dimensional organization of geospatial data can be implemented using octrees. To map the surface of the Earth onto a plane, Mercator or another suitable projection can be used.

The map database 18 also stores style parameters 22 for rendering roads at certain zoom levels. For example, style parameters 22A-1, 22-A2, . . . describe style parameters for various styles at zoom level 14, and style parameters 22B-1, 22B-2, . . . describe style parameters for various styles at zoom level 17. Each set of style parameters can describe a respective color and width for each of several strokes. When providing road data to client devices, the map data server 12 can assign a style identifier to each road segment in a given map tile. For example, the map data server 12 can indicate that the segment of an interstate highway present in the map tile should be rendered using style 1, a local road should be rendered using style 4, a bicycle path should be rendered using style 13, etc.

According to some implementations, when the client device 14A or 14B requests map data for a certain geographic area to be displayed at zoom level Z, the map data server 12 style parameters, and possibly other map data, for the requested zoom level as well for the next zoom level Z+1. Further, the map data server 12 alternatively or additionally can provide some of the map data for the zoom level Z−1. Depending on the implementation, the map data server 12 can provide style parameters (e.g., stroke 1 width=0x05, stroke 1 color=0xFFFF000, stroke 2 width=0x04, stroke 2 color=0x8000FF00) for several styles and at several zoom levels at the same time as the map data or during a separate session for retrieving style parameters.

For example, the client device 14A may request map data for rendering a digital map of a geographic region R at zoom level 14, and the map data server 12 can provide the map data for zoom level 14 along with style information for zoom levels 14 and 17, for each road visible at zoom level 14 (or, alternatively, zoom levels 14-17). Using these style parameters, the client device 14A can scale representations of roads in the region R between zoom levels 14 and 17. More particularly, the client device 14A can use the techniques discussed in more detail below to interpolate style parameters and display a certain road segment at zoom level 15, 16, 14.3, 15.55, etc.

With continued reference to FIG. 1, the map data server 12 can be implemented as a single device or as a group of devices. One or more of these devices can include one or more processors 30, a network interface 32, and a non-transitory computer-readable memory 34 that stores instructions executable on the one or more processors 30. For example, a request processor 36 can process requests from client devices 14A and 14B, identify and retrieve relevant polylines and style parameters from the map database 18 (along with other relevant map data), and transmit this data to the requesting client device.

Similarly, the map database 18 can be implemented in a single storage device or multiple storage devices. The communication network 16 can include any suitable number of Internet links, local area links, long-range wireless link, short-range wireless links, etc.

In the example of FIG. 1, the client devices 14A and 14B are portable devices such as smartphones or tablet computers, for example. In general, however, the techniques for interpolating style parameters and rendering patterns of graphics can be utilized both in portable and non-portable computing devices. The client devices 14A and 14B in this example are generally similar, except that the client device 14A implements an interpolation technique that includes passing style parameters to a vertex shader in the form of vertex attributes, and client device 14B implements an interpolation technique that includes encoding style parameters as a texture and transforming texture coordinate space. Further, the client device 14B in this example implements a technique for generating smoothly scaleable patterns arranged along paths on digital maps.

The client device 14A includes one or more general-purpose processors 40A, a network interface 42A configured to communicate with other devices via the network 16, a touchscreen 44A configured to receive gesture-based input, a non-transitory computer-readable memory 46A, and a graphics card 48A that has buffer(s) 66. The client device 14B includes components 40A-48B that are generally similar to components 40A-48A, respectively. In other implementations, the client devices 14A and 14B can include additional components or, conversely, not include some of the components illustrated in FIG. 1.

The memory 46A of the client device 14A stores a mapping module 50A that generates interactive digital maps. Depending on the implementation, the mapping application can operate as a standalone application or as a component of another application such as a web browser, for example. The mapping module 50A includes a vertex attribute generator for zoom style groups 60. In operation, the vertex attribute generator 60 provides style parameters as vertex attributes to a style interpolating vertex shader 62 that execute on the graphics card 48A. The vertex shader 62 and a fragment shader 64 then interpolate style parameters and render roads at specified zoom levels, as discussed in more detail with reference to FIGS. 2A-C.

The memory 46B of the client device 14B stores a mapping module 50B that provides functionality similar to the mapping application 50A. The mapping module 50B includes a road geometry and style information texture generator 70 that generates maximally extruded road geometry, encodes style parameters as a texture, and provides the texture to a style interpolating vertex shader 74. The vertex shader 74 and a style interpolating fragment shader 76 then interpolate style parameters and render roads at specified zoom levels, as discussed in more detail with reference to FIGS. 3A-E.

The mapping module 50B also includes a patterned path generator that arranges multiple instances of an arrow or another graphics element along a path to eliminate sudden transitions in the display of the resulting pattern during scaling across zoom levels, as discussed in more detail with reference to FIGS. 4A-D.

Providing Style Parameters as Vertex Attributes

Figure 2A:
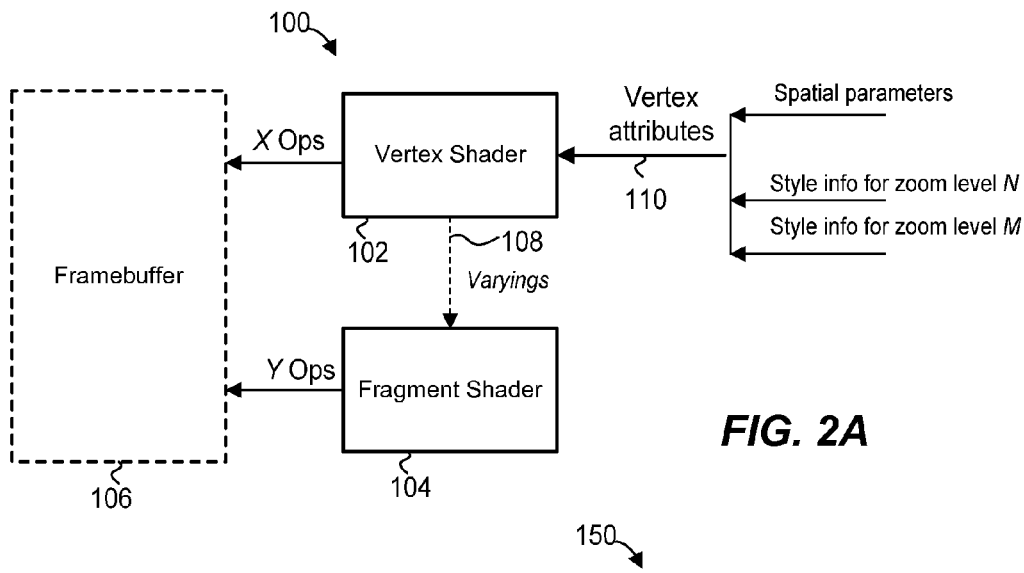
FIG. 2A is a block diagram of an example graphics pipeline that can be implemented in a client device of FIG. 1, in which style information is provided to shaders in the form of vertex attributes to efficiently and accurately interpolate style parameters for various zoom levels.

Referring to FIG. 2A, a graphics pipeline 100 can be implemented in a graphics card or, more generally, a hardware configured specifically to render graphics. The pipeline 100 includes a vertex shader 102 and a fragment shader 104, which can operate on a framebuffer 106. The vertex shader 102 receives vertex attributes 110 that include both conventional spatial parameters, such as coordinates of vertices that make up a road centerline and texture coordinates, and spatial parameters, such as width, color, the number of strokes, etc. The vertex shader 102 during operation outputs values such as color that are passed to fragment shader 104 in the form of so-called varyings 108. The number of times Y the fragment shader 104 executes can exceed the number of times X the vertex shader 102 executes by a factor of 100, for example.

The graphics pipeline 100 can be implemented in the graphics card 48A in the client device 14A, for example. More specifically, the vertex attribute generator 60 operating in the mapping module 46A can generate the vertex attributes 110. The shaders 62 and 64 can be implemented as the shaders 102 and 104, respectively.

Figure 2B:
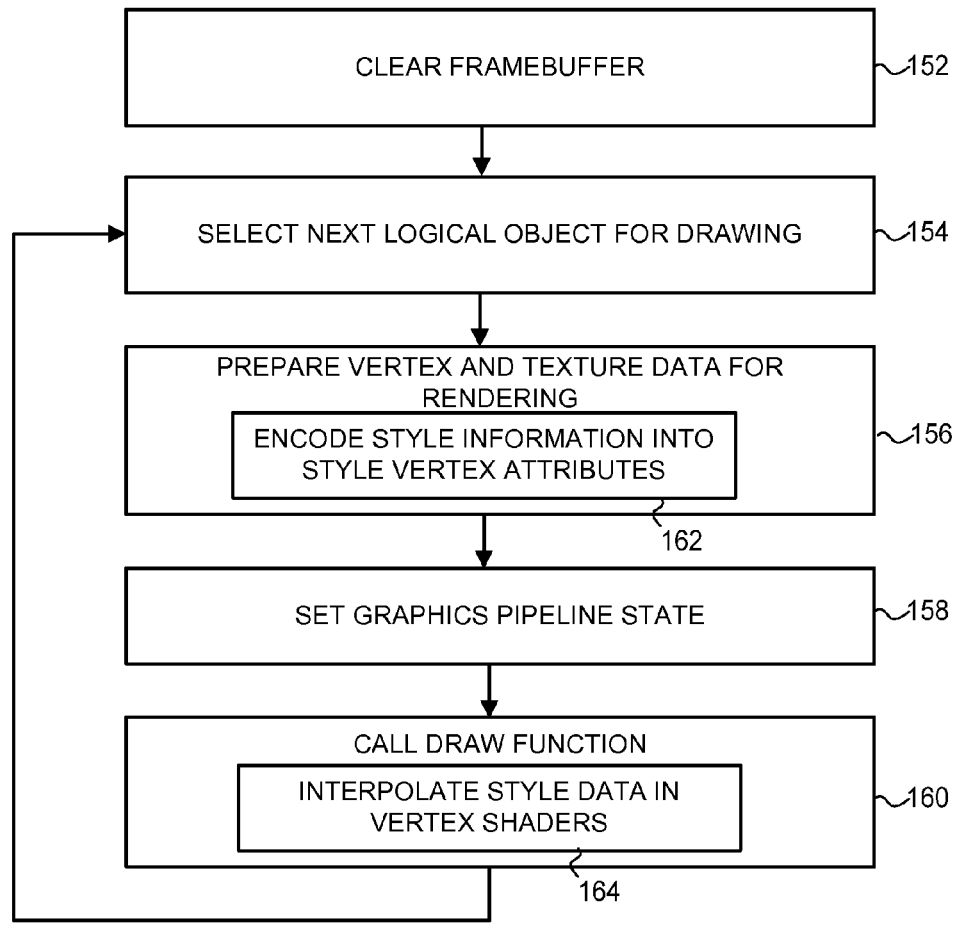
FIG. 2B is a flow diagram of an example method for operating the graphics pipeline of FIG. 2A, which can be implemented in a client device of FIG. 1.

As illustrated in FIG. 2B, to render a frame of information in the graphics pipeline 100, the framebuffer 106 is cleared first at stage 152. At stage 154, a logical object for drawing is selected. For example, all road segments for a certain tile can be put into a Vertex Buffer Object (VBO) so as to be drawn with a one call to a draw function. In some cases, if the amount of data does not fit into a single VBO, the data is split into multiple VBOs. A corresponding style identifier can be encoded into each vertex to enable the vertex shader to look up style parameters for the vertex as this vertex is being drawn. As discussed below, style parameters can include color and width definitions for various strokes associated with the style.

Further, in one example implementation, road data within a VBO is sorted by the following values: plane, grade, stroke, and z-within-grade (where the z-value controls the depth of a graphic). Thus, for road segments in a tile having the same plane and grade, all instances of stroke 0 are ordered first, followed by all instances of stroke 1, etc. For two road segments having different plane and grade combinations, strokes 0, 1, etc. are ordered for the lower plane and grade combination first, followed by strokes 0, 1, etc. for the higher plane and grade combination.

Next, vertex and texture data are prepared for rendering at stage 156. The graphics pipeline state is set at stage 158, and a draw function is called at stage 160 to execute the vertex shader and the fragment shaders. The graphics pipeline 100 then performs the stages 156, 158, and 160 for the next logical object, until every logical object in the frame has been drawn.

As further illustrated in FIG. 2B, style information is encoded into style vertex attributes at block 162, which can be executed on a general-purpose processors such as the processor 40A of FIG. 1. As a more specific example, the vertex attribute generator 60 can execute block 162 as part preparing the graphics pipeline 100 at stage 156. The vertex shader then interpolates the data encoded into style vertex attributes at block 164, as discussed in more detail with reference to FIG. 2C.

Figure 2C:
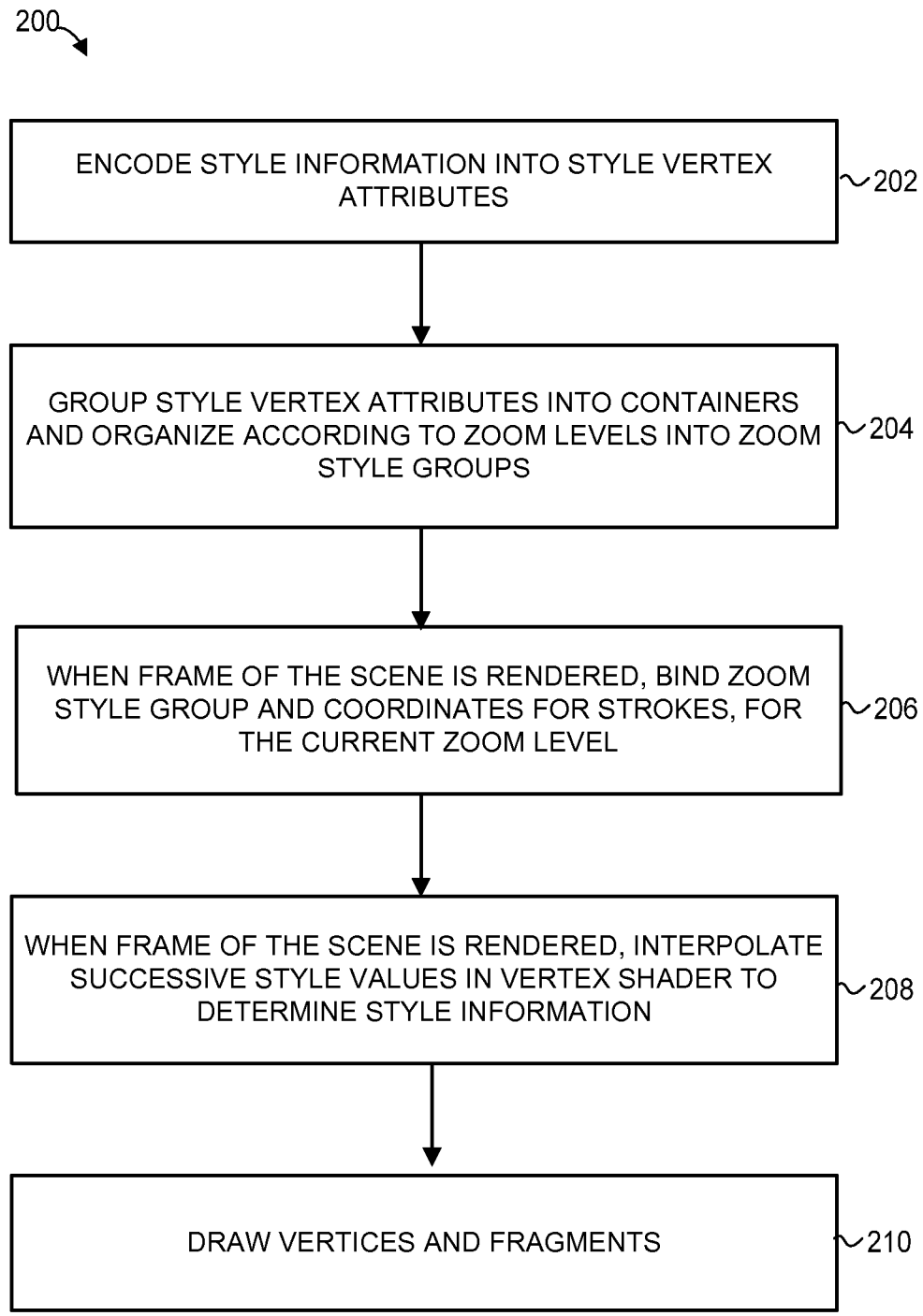
FIG. 2C is a flow diagram of an example method for generating parameters for the graphics pipeline of FIG. 2A and interpolate style information in the graphics pipeline, which can be implemented in a client device of FIG. 1.

Now referring to FIG. 2C, at least some of the blocks of an example method 200 for generating parameters for the graphics pipeline of FIG. 2A can be implemented in the vertex attribute generator 60, for example, as a set of software instructions that execute on the processor(s) 40A.

The method 200 begins at block 202, where style information is encoded into style vertex attributes. These style vertex attributes augment fixed vertex attributes that contain spatial position information related to an object, such as Cartesian coordinates of the object. The style vertex attributes can include such as information as widths and colors for several strokes, number of strokes, etc. Referring back to FIG. 1, a certain style vertex attribute can include style parameters 22A-1 for road style S1 at zoom level 14, another style vertex attribute can include style parameters 22A-2 for road style S2 at zoom level 14, and another style vertex attribute can include style parameters 22B-2 for road style S2 at zoom level 17.

Style vertex attributes are grouped into containers that are separate, but which can be combined interchangeably with conventional vertex attributes describing position, at block 204. Further, the grouping of style vertex attributes can be further delineated based on zoom levels. Again referring back to FIG. 1, a style vertex attribute corresponding to style parameters 22A-1 and a style vertex attribute corresponding to style parameters 22B-1 (both of which describe road style S1 at different zoom levels) can form a zoom style group G, which a vertex shader then can use to interpolate style parameters at least in the range between zoom level 14 and zoom level 17.

At block 206, a zoom style group along with the corresponding conventional vertex attributes can be "bound" (e.g., by executing appropriate function(s) supported by the graphics pipeline and the programming language) to the vertex shader when a frame of a scene is rendered, for the current zoom level of the virtual camera. Thus, a zoom style group can be understood as a logical, variable groups of vertex attribute data that can be interchangeably combined with canonical fixed vertex attribute data, in accordance with the current zoom level.

For example, the mapping module 46A of FIG. 1A can process user input, such as an instance of a pinch-to-zoom gesture applied to the touchscreen 44A, and determine that the current zoom level for the camera should be 14.7. The mapping module 46A can obtain a polyline for a road segment visible in the viewport at zoom level 14.7, identify style S1 in which the road segment must be rendered, and indicate to the vertex attribute generator 60 that the zoom level should be 14.7. The vertex attribute generator 60 in turn can select, from among the available set of resources, style parameters 22A-1 and 22B-1 for style S1 corresponding to zoom levels 14 and 17, respectively. The vertex attribute generator 60 then can execute blocks 202-206 to prepare vertex attributes for use by a vertex shader.

It is noted that, if style parameters are available for zoom levels more proximate to the selected zoom level, the mapping module 46A can use these parameters instead. Thus, if style parameters for zoom levels 14 and 15 are available, the mapping module 46A can select these parameters (rather than style parameters for zoom levels 14 and 17) for rendering a road at zoom level 14.7.

When the frame of the scene is rendered, successive style parameters, which correspond to successive zoom levels, are interpolated in a vertex shader, in accordance with the current zoom level of the virtual camera (block 208). The vertices and fragments of the road segments are then drawn at block 210.

Referring generally to FIGS. 2A-C, it is noted that these techniques do not require fetching or dereferencing of style data in either the vertex or fragment shaders, thus reducing the amount of shader logic and improving overall efficiency. Further, by augmenting vertex attribute data with style parameters and referencing style parameters as attributes in the vertex shader, the vertex attribute generator 60 can combined strokes into large groups in accordance with the batching principle, thereby further improving performance.

Figure 3A:
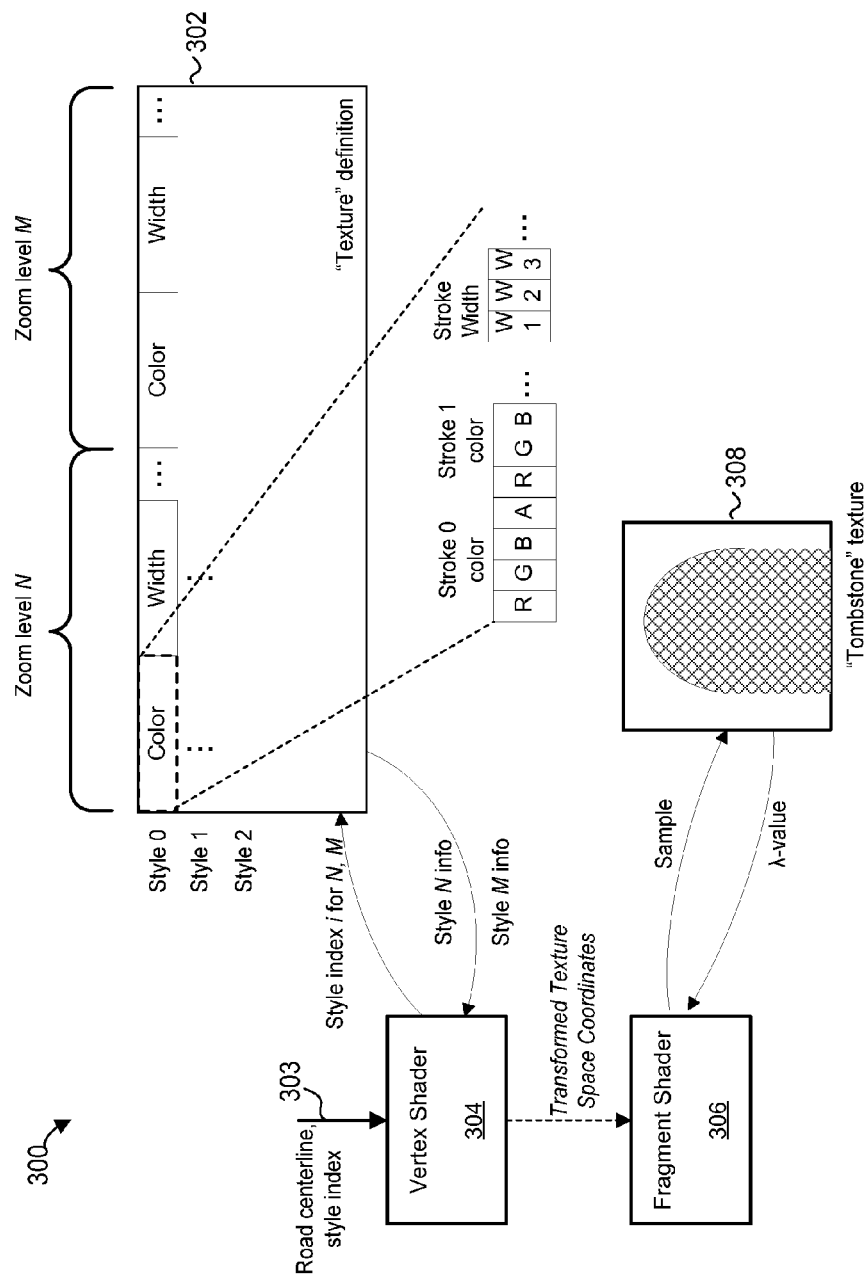
FIG. 3A is a block diagram of another example graphics pipeline that can be implemented in the system of FIG. 1, in which style information is encoded in the form of a texture, and in which texture coordinate space is transformed instead of road geometry.

Encoding Style Parameters in a Texture and Transforming Texture Coordinate Space FIG. 3A illustrates an example graphics pipeline 300, which can be implemented in the client device 14B, for example. The graphics pipeline 300 uses a texture table 302, in which style parameters for zoom levels N and M are encoded in the form of a texture. For example, the table 302 can store color and width identifiers for each of n strokes and other information for the several styles applied to road segments in a given scene. The exact format of the texture table 302 can be device- and/or OS-specific.

In operation, a vertex shader 304 receives (e.g., as spatial vertex attributes) road centerline data 303 and a style identifier for the road centerline, and retrieves style parameters for successive zoom levels for the specified style from the table 302. The vertex shader 304 then interpolates these parameters for the current zoom level to determine stroke width, color, etc.

Figure 3B:
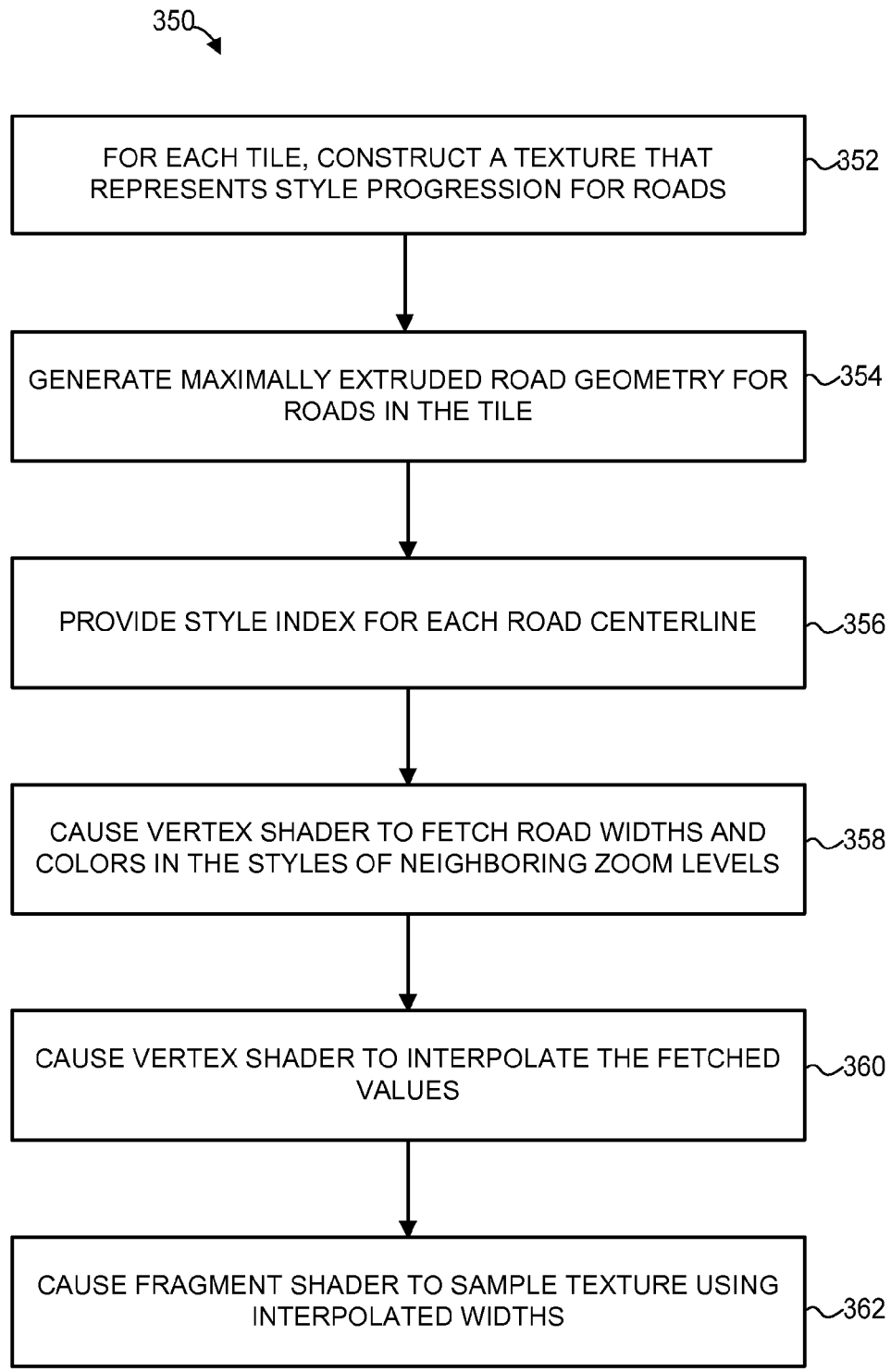
FIG. 3B is a flow diagram of an example method for operating the graphics pipeline of FIG. 3A, which can be implemented in a client device of FIG. 1.
Figure 3C:
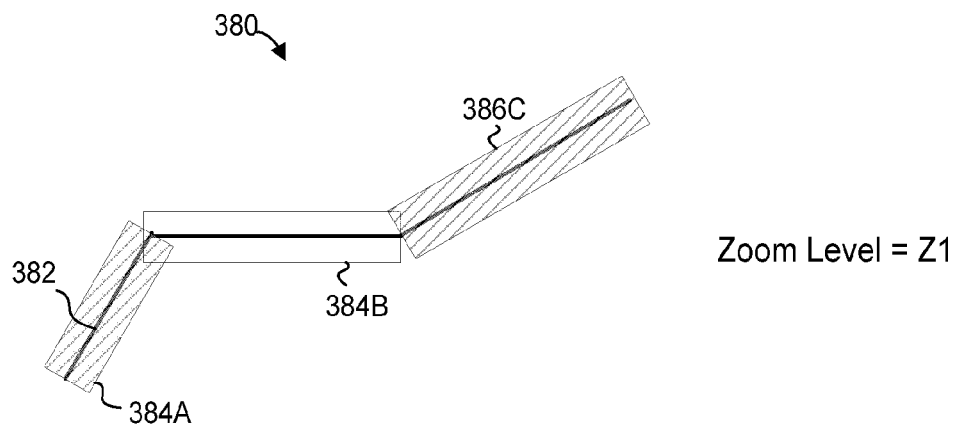
FIGS. 3C and 3D schematically illustrate texture coordinate space transformation in the graphics pipeline of FIG. 3A.
Figure 3D:
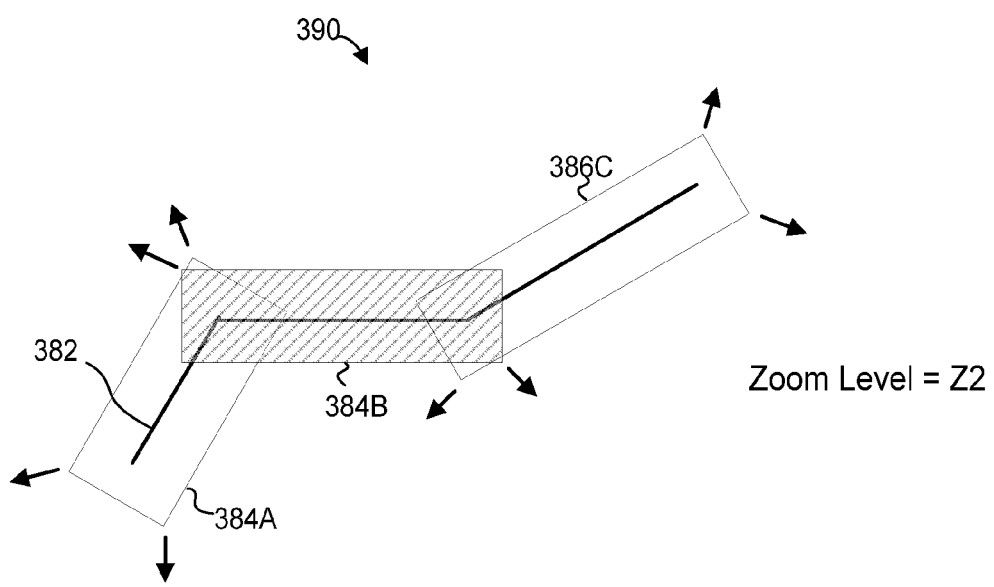
Figure 3E:
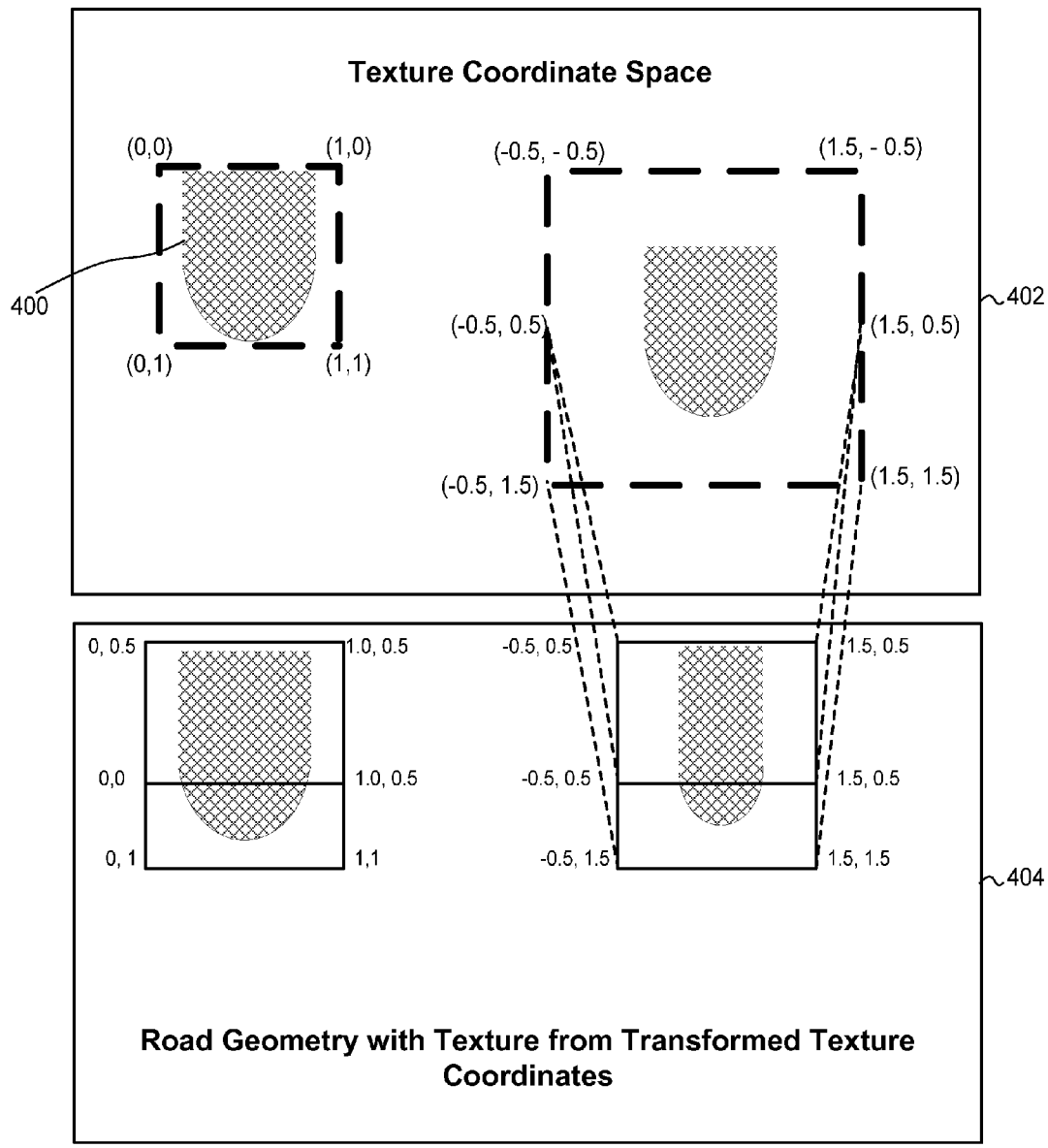
FIG. 3E is another illustration of texture coordinate space transformation in the graphics pipeline of FIG. 3A.

Rather than transforming road outline geometry, the vertex shader 304 in one embodiment uses the interpolated width to transform texture space coordinates, as illustrated in more detail in FIGS. 3C-E. The vertex shader 304 provides the transformed texture space coordinates to a fragment shader 306 (as varying, for example).

To address aliasing issues, and to render end caps for line segments, the fragment shader 306 in some embodiments also receive a tombstone-shaped texture 308 in a bitmap format, for example. In some implementations, however, the texture 308 can be shaped as a semi-circle. In FIG. 3A, the shaded portions of the tombstone-shaped texture 308 represent the opacity of one, and unshaded portions of the tombstone-shaped texture represent the opacity of zero. When rendering lines, the fragment shader 306 can sample the tombstone-shaped texture 308 using coordinates in the transformed texture space to determine the alpha-value for a pixel. The fragment shader 306 need not rely on the tombstone-shaped texture 308 to determine the color of a pixel, as pixel colors are interpolated between vertices based on the style information calculated in the vertex shader 304.

Referring now to FIG. 3B, example method 350 for operating the graphics pipeline of FIG. 3A can be implemented in the client device 14B of FIG. 1, for example. As a more specific example, at least some of the blocks of method 350 can be implemented in the road geometry and style information texture generator 70.

At block 352, a texture is constructed to represent a progression of styles (e.g., zoom level 11, zoom level 12) for all roads in a certain unit of a digital map, such as a map tile. Block 352 can be executed for each map tile in a viewport. In at least some of the embodiments, this progression of styles can be encoded similar to the texture 302 of FIG. 3A.

Next, a maximally extruded road geometry for the relevant roads is generated at block 354. In other words, for a given road centerline, the most detailed outline geometry of the road possible for the available data is generated. A corresponding style index is assigned to each road centerline at block 356 for use by the vertex shader. The maximally extruded road geometry then can be reused to render each stroke for the road, so as to not transform road geometry in vertex or fragment shaders.

The data generated at blocks 352-356 can be provided to a vertex shader, which can fetch road width and color values for the corresponding strokes at the relevant zoom levels from the texture encoding style progression (block 358). Similar to example discussed above with reference to FIGS. 2A-C, in order to generate style parameters for a road in style S at zoom level 11.2, the vertex shader can retrieve style parameters for zoom levels 11 and 12 from the texture and interpolate these parameters.

At block 360, the vertex shader can interpolate style parameters and transform coordinates in the texture space using the interpolated width values. After the vertex shader renders vertices, the fragment shader at block 362 can generate pixel colors for the fragments within roads and sample a tombstone-shaped texture (or another suitable texture describing end caps) in accordance with the transformed coordinates to apply the alpha-value to the pixels.

For additional clarity, FIGS. 3C and 3D schematically illustrate the "stretching" of a texture to render a road segment at two different zoom levels, Z1 and Z2. A rendering 380 includes maximally extruded outline geometry for a road, represented by a centerline 382. Texture instances 384A, 384B, and 384C are mapped to screen space according to one set of coordinates at zoom level Z1. On the other hand, a rendering 390 includes the same centerline 382 at zoom level Z2, but each of the texture instances 384A, 384B, and 384C is transformed so as to cover a larger portion in screen space, and thereby generate a wider representation of the road at a higher level of magnification of the corresponding digital map.

FIG. 3E further illustrates transformation of coordinates of a texture 400 in texture coordinate space 402 and generation of road geometry with texture from the transformed texture coordinates in screen space 404. In FIG. 3E, transformed texture coordinate space is illustrated using dotted boxes.

A vertex shader, such as the vertex shader 304 of FIG. 3A, can apply a uniform scale from (0.5, 0.5) to the texture coordinate of a vertex. To this end, the vertex shader can first offset each texture coordinate by −0.5, placing each coordinate in the range of [−0.5, 0.5]. The vertex shader then can use the inverse of the fractional interpolated width to scale the texture coordinates. For example, if a stroke is half the width of the widest stroke, a scale of factor of two is applied to the offset texture coordinate, as illustrated on the right side of the texture coordinate space 402.

The vertex shader then offsets the result by 0.5, thereby placing the adjusted coordinates back into the original coordinate space. FIG. 3E further illustrates, in the lower portion of the drawing, how the texture coordinate space affects of the mapping of the texture on road geometry.

Rendering Repeating Graphics Elements Along Paths on Digital Maps

To enable smooth transitions between zoom levels for patterns displayed along roads and other paths, the patterned path generator 72 of FIG. 1, or another suitable software component, can implement the technique discussed next with reference to FIGS. 4A-D.

Figure 4A:
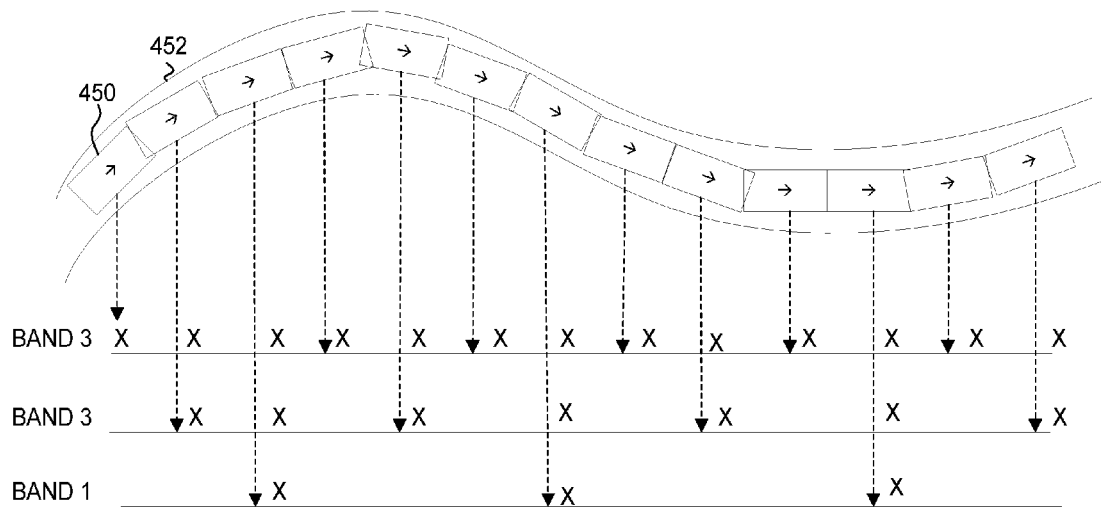
FIGS. 4A and 4B schematically illustrate an example technique for rendering arrows sequentially arranged over a road on a digital map to enable smooth transitions between zoom levels, which can be implemented in the computing system of FIG. 1.

Referring first to FIG. 4A, patterned path generator 72 can arrange instances of an arrow graphic 450 along a path 452. In general, the patterned path generator 72 can operate on any graphics element, such as a dash, a dot, a two-way arrow, etc. The path 452 in this example represents a one-way street, but in general can represent any type of a path or trajectory. When arranging instances of the arrow graphic 450, the patterned path generator 72 can use a maximally extruded outline of the path 452, for example.

The arrow graphic 450 can be stored as a texture, for example. The patterned path generator 72 in this case can use coordinate transformation in texture space discussed above.

The patterned path generator 72 can arrange multiple instances of the arrow graphic 450 at certain positions along the path 452 at a high level of magnification. These positions remain fixed across multiple zoom levels. However, the instances in some positions are displayed only at zoom levels in the first band of relatively low zoom levels ("level 1"), some instances are displayed at zoom levels in the second band of higher low zoom levels ("level 2") as well in the first band, and some instances are displayed at zoom levels in the third band of relatively high zoom levels ("level 3") as well as in the first band and the second band. Each band can include any desirable number of discrete and/or fractional zoom levels, and as many bands as desired can be defined.

In FIG. 4A, instances of the arrow graphic 450 that are displayed for a band are marked with symbol "X." Thus, in band 1, which can correspond to a relatively low level of magnification, only three instances of the arrow graphic 450 are displayed; at a higher level of magnification in band 2, twice as many instances of the arrow graphic 450 are displayed; and, at an even higher level of magnification in band 3 four times as many instances of the arrow graphic 450 are displayed.

In the example illustrated in FIG. 4A, the number of arrows at each subsequent band doubles relative to the previous band. However, any new number of arrows can be introduced in the next band of higher zoom levels.

Figure 4B:
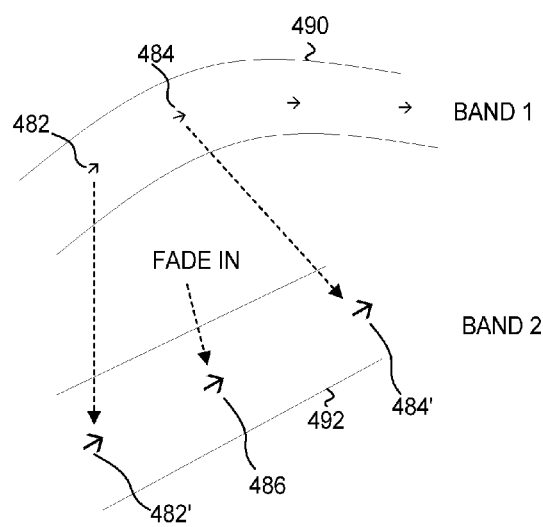

As illustrated in FIG. 4B, the instances of the arrow graphic 450 are effectively affixed to certain locations on a road segment 490, and thus the arrows appear to travel apart as the user zooms in on a portion 492 of the road segment 490 to increase the zoom level from within the band 1 to band 2.

As further illustrated in FIG. 4B, the patterned path generator 72 can enlarge the instances of the arrow graphic 450 as the zoom level increases. Thus, the instance 482' corresponds to the instance 480, enlarged in accordance with the new zoom level. To this end, the patterned path generator 72 can transform the coordinates in the texture space without modifying the underlying road geometry.

Further, the new instance of the arrow graphic 486 can gradually fade in as the user zooms in from a zoom level within the band 1 to a new zoom level within band 2. Similarly, the instance 486 can gradually fade out when the user zooms out from within band 2 back to a zoom level within band 2. To this end, the patterned path generator 72 can gradually value the alpha-value of the arrow graphic 450, for example.

Depending on the implementation, the fade-in and fade-out of arrow graphics can be controlled as a function of the user's zoom level and/or the function of time. As a more specific example, gradual fade-in of the arrow graphic 486 in one implementation is triggered when the zoom level crosses a certain boundary, and the level of transparency of the arrow graphic 486 then gradually decreases at a preconfigured rate until the arrow graphic 486 is fully opaque.

In another implementation, however, arrow graphics can fade in and out faster when the user zooms in and out of map areas faster.

Thus, rather than recalculating where arrows should be drawn at a new zoom level, and rather than losing arrows altogether by zooming in on an area between two instances of the arrow graphic 450, the patterned path generator 72 gradually increases the density of arrows without sudden "jumps." As a result, patterns of arrows of other graphics elements scale up and down smoothly.

Figure 4C:
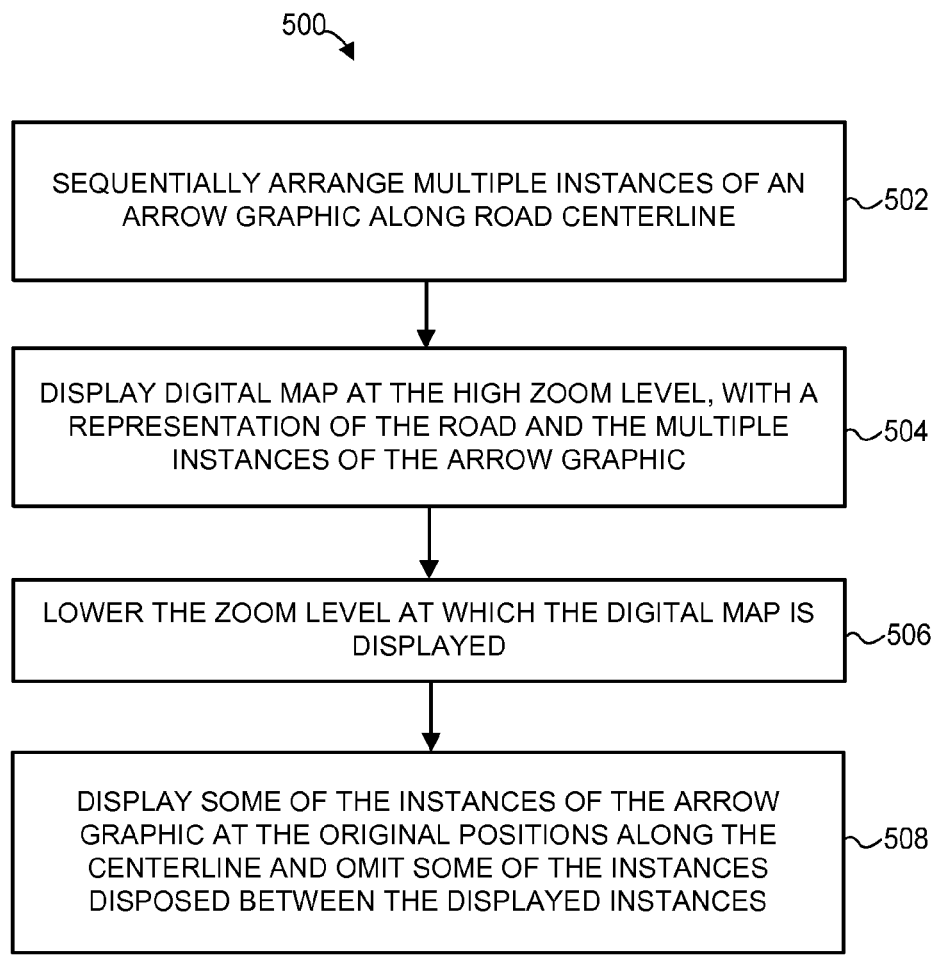
FIG. 4C is a flow diagram of an example method for displaying patterns of recurring graphics on interactive digital maps, which can be implemented in the computing system of FIG. 1.

For additional clarity, FIG. 4C illustrates an example method 500 for displaying patterns of recurring graphics on interactive digital maps. The method 500 can be implemented in the patterned path generator 72 of FIG. 1, for example. For clarity, the method 500 is discussed below with reference to arrows overlaying a road. However, it will be understood that this technique similarly can apply to other graphics elements and other paths.

At block 502, multiple instances of the arrow graphic are sequentially arranged along a road centerline, which can be maximally extruded so as to properly accommodate a high number of instances of the arrow graphic. At block 504, a digital map including a representation of the road is displayed at a high zoom level (corresponding to high magnification of the digital map). All the instances of the arrow graphic are displayed along the road at this zoom level.

After the zoom level of the digital map is lowered at block 506, some but not all of the originally arranged instances of the arrow are displayed in their original positions, i.e., at points on the digital map corresponding to the same geographic locations. As illustrated in FIGS. 4A and 4B, every other arrow graphic can be omitted at the lower zoom level, for example.

Figure 4D:
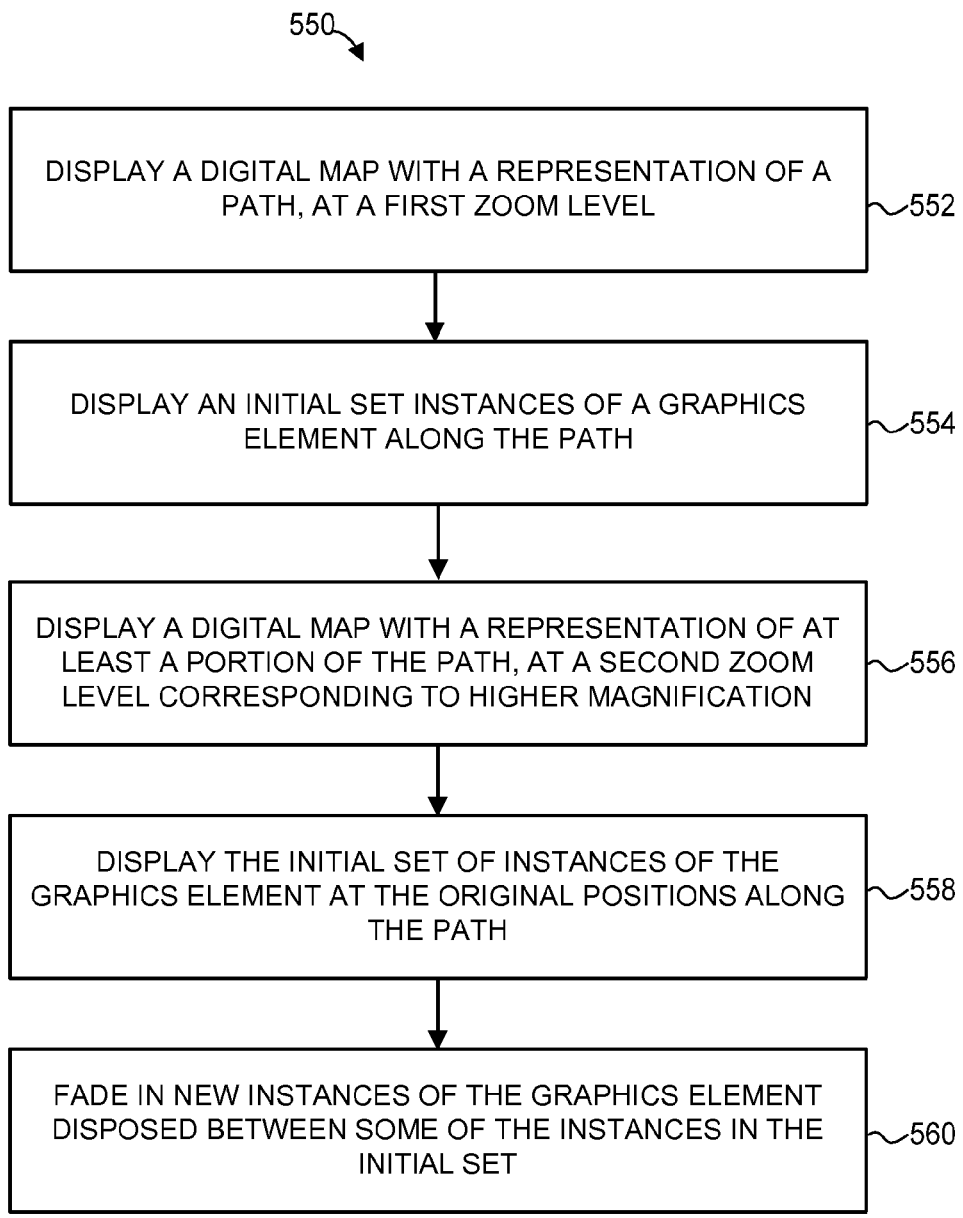
FIG. 4D is a flow diagram of another example method for displaying patterns of recurring graphics on interactive digital maps, which can be implemented in the computing system of FIG. 1.

FIG. 4D is a flow diagram of another example method 550 for displaying patterns of recurring graphics on interactive digital maps, which also can be implemented in the patterned path generator 72 or another suitable software component.

At block 552, a digital map including a representation of a path is displayed at a first zoom level, which can be relatively low. An initial set of instances of the graphics element can be displayed along the path at block 554. As discussed above, this initial set can be selected from among the larger set of instances places along the centerline corresponding to the maximally extruded geometry of the path.

At block 556, the digital map is displayed at a higher level of magnification. The new digital map can include at least a portion of the path displayed at blocks 552 and 554. The initial set of instances of the graphics element is displayed at the original positions along the path. Of course, these original positions will correspond to new positions on the user interface, as the same geographic area is now viewed with larger magnification.

At block 560, new instances of the graphics element fade in. These new instances are disposed between some of the instances in the initial set. Referring back to FIG. 4B, the instances 482 and 484 can define a portion of the first set, which is displayed both at the lower zoom level and at the higher zoom level. The instance 486 can be one of the new instances that fades in when the zoom level increases.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for displaying paths at various zoom levels a client device through the disclosed principles herein. Thus, while particular embodiments and applications have been illustrated and described, it is to be understood that the disclosed embodiments are not limited to the precise construction and components disclosed herein.

What is claimed is:

1. A method for providing smoothly scaleable map features on interactive digital maps, the method comprising:
receiving by one or more general-purpose processors from a server: (i) map data for a map feature, and (ii) style parameters corresponding to a plurality of styles for rendering map features at each of a plurality of zoom levels;

selecting from among the received style parameters (i) a first plurality of style parameters, associated with a particular style, for rendering the map feature at a first zoom level, and (ii) a second plurality of style parameters, associated with the particular style, for rendering the map feature at a second zoom level;

forming a container defining the particular style at multiple zoom levels by:
 (i) encoding first style vertex attributes with (a) the first plurality of style parameters for rendering the map feature at the first zoom level, and (b) spatial parameters for the map feature,
 (ii) encoding second style vertex attributes with (a) the second plurality of style parameters for rendering the map feature at the second zoom level, and (b) spatial parameters for the map feature; and
 (iii) grouping the first and second style vertex attributes to form the container;

passing the container from the one or more general-purpose processors to a graphics processor by providing the container to a vertex shader implemented by the graphics processor;

configuring the vertex shader to generate from the container an interpolated set of style parameters for rendering the map feature at a certain zoom level between the first zoom level and the second zoom level by interpolating between the first plurality of style parameters encoded to the first style vertex attributes and the second plurality of style parameters encoded to the second style vertex attributes; and rendering the map feature at the certain zoom level in accordance with the interpolated set of style parameters.

2. The method of claim 1, wherein the map feature is a stylized representation of a path, and wherein each plurality of style parameters specifies at least stroke width and color.

3. The method of claim 2, wherein the path is one of a road, a bicycle path, or a mass transit line.

4. The method of claim 1, wherein forming the container defining the particular style at multiple zoom levels comprises: forming a vertex buffer object (VBO) defining the particular style at multiple zoom levels.

5. The method of claim 4, wherein forming the VBO comprises: sorting the first style vertex attributes and the second style vertex attributes according to one or more of the following: plane, grade, stroke, and z-within-grade.

6. The method of claim 1, further comprising:
configuring the one or more general-purpose processors to encode the first and second pluralities of style parameters as a two-dimensional texture;
configuring the one or more general-purpose processors to provide the two-dimensional texture to the vertex shader; and
configuring the vertex shader to generate from the two-dimensional texture the interpolated set of style parameters for rendering the map feature at the certain zoom level between the first zoom level and the second zoom level.

7. The method of claim 6, wherein the texture is a first texture and the method further comprises:
configuring the one or more general-purpose processors to generate geometry for the map feature;
configuring the one or more general-purpose processors to provide a second texture to the vertex shader, wherein the second texture defines a graphic in a texture coordinate space; and
configuring the vertex shader to transform the texture coordinate space in accordance with the interpolated set of style parameters to apply the graphic to the geometry.

8. The method of claim 7, further comprising configuring a fragment shader to sample the second texture in accordance with the transformed texture coordinates.

9. The method of claim 7, further including generating maximally extruded geometry for the map feature.

10. The method of claim 6, wherein configuring the one or more general-purpose processors to encode the first and second pluralities of style parameters as a two-dimensional texture comprises configuring the one or more general-purpose processors to:
identify a plurality of types of road segments in a certain geographic area; and
encode, in the two-dimensional texture, respective first and second sets of style parameters for each of the plurality of types of road segments.

11. The method of claim 1, wherein the map feature corresponds to a single rectangular map tile.

12. A computing device comprising:
one or more general-purpose processors;
a graphics processor;
a network interface for receiving: (i) map data for a map feature, and (ii) style parameters corresponding to a plurality of styles for rendering map features at each of a plurality of zoom levels, the style parameters including (a) a first plurality of style parameters, associated with a particular style, for rendering the map feature at a first zoom level, and (b) a second plurality of style parameters, associated with the particular style, for rendering the map feature at a second zoom level;
a non-transitory computer-readable memory storing thereon:
 first instructions that implement a mapping module which, when executed on the one or more general-purpose processors:
  (A) selects from among the received style parameters the first plurality of style parameters and the second plurality of style parameters;
  (B) forms a container defining the particular style at multiple zoom levels by:
   (i) encoding first style vertex attributes with (a) the first plurality of style parameters for rendering the map feature at the first zoom level, and (b) spatial parameters for the map feature,
   (ii) encoding second style vertex attributes with (a) the second plurality of style parameters for rendering the map feature at the second zoom level, and (b) spatial parameters for the map feature; and
   (iii) grouping the first and second style vertex attributes to form the container; and
  (C) passes the container to the graphics processor, and
 second instructions that implement a vertex shader which, when executed on the graphics processor:
  (A) generates from the container an interpolated set of style parameters for rendering the map feature at a certain zoom level between the first zoom level and the second zoom level by interpolating between the first plurality of style parameters encoded to the first style vertex attributes and the second plurality of style parameters encoded to the second style vertex attributes, and (B) renders the map feature at the certain zoom level in accordance with the interpolated set of style parameters.

13. The system of claim 12, wherein the container is a vertex buffer object (VBO).

14. The system of claim 12, wherein the map feature is a stylized representation of a path, and wherein each plurality of style parameters specifies at least stroke width and color.

15. The system of claim 14, wherein the path is one of a road, a bicycle path, or a mass transit line.

16. The system of claim 12, further including:
   instructions that, when executed on the one or more general-purpose processors: (i) encode the first and second pluralities of style parameters as a two-dimensional texture; and (ii) provide the two-dimensional texture to the vertex shader; and
   instructions that, when executed on the graphics processor: generate from the two-dimensional texture the interpolated set of style parameters for rendering the map feature at the certain zoom level between the first zoom level and the second zoom level.

17. The system of claim 16, further including:
   instructions that, when executed on the one or more general-purpose processors: generate geometry for the map feature and provide a second texture to the vertex shader, wherein the second texture defines a graphic in a texture coordinate space; and
   instructions that, when executed on the graphics processor: transform the texture coordinate space in accordance with the interpolated set of style parameters to apply the graphic to the geometry.

18. The system of claim 17, further including instructions that implement a fragment shader which, when executed on the graphics processor: sample the second texture in accordance with the transformed texture coordinates.

19. The system of claim 17, further including instructions that, when executed on the one or more general-purpose processors:
   identify a plurality of types of road segments in a certain geographic area; and
   encode, in the two-dimensional texture, respective first and second sets of style parameters for each of the plurality of types of road segments.

20. The system of claim 12, wherein the map feature corresponds to a single rectangular map tile.

* * * * *